(12) United States Patent
Marggraff et al.

(10) Patent No.: US 8,446,298 B2
(45) Date of Patent: May 21, 2013

(54) QUICK RECORD FUNCTION IN A SMART PEN COMPUTING SYSTEM

(75) Inventors: Jim Marggraff, Lafayette, CA (US); Tracy L. Edgecomb, Berkeley, CA (US)

(73) Assignee: LiveScribe, Inc., Oakland, CA (US)

( * ) Notice: Subject to any disclaimer, the term of this patent is extended or adjusted under 35 U.S.C. 154(b) by 1056 days.

(21) Appl. No.: 12/415,115

(22) Filed: Mar. 31, 2009

(65) Prior Publication Data

US 2009/0251336 A1   Oct. 8, 2009

Related U.S. Application Data

(60) Provisional application No. 61/042,258, filed on Apr. 3, 2008.

(51) Int. Cl.
*H03K 17/94* (2006.01)
*G06T 13/00* (2006.01)
*G06F 3/12* (2006.01)
*G06F 9/45* (2006.01)
*G06K 9/00* (2006.01)

(52) U.S. Cl.
USPC ............. 341/22; 341/29; 345/473; 358/1.15; 382/181; 717/144

(58) Field of Classification Search
None
See application file for complete search history.

(56) References Cited

U.S. PATENT DOCUMENTS

| | | | |
|---|---|---|---|
| 5,970,455 A * | 10/1999 | Wilcox et al. | 704/270 |
| 7,175,095 B2 | 2/2007 | Pettersson et al. | |
| 7,281,664 B1 | 10/2007 | Thaeler et al. | |
| 7,319,454 B2 * | 1/2008 | Thacker et al. | 345/163 |
| 7,627,703 B2 * | 12/2009 | Oliver | 710/72 |
| 7,770,116 B2 * | 8/2010 | Zhang et al. | 715/716 |
| 7,810,730 B2 * | 10/2010 | Van Schaack et al. | 235/454 |
| 2002/0069220 A1 | 6/2002 | Tran | |
| 2004/0229195 A1 | 11/2004 | Marggraff et al. | |
| 2006/0033725 A1 | 2/2006 | Marggraff et al. | |
| 2006/0066591 A1 | 3/2006 | Marggraff et al. | |
| 2006/0067576 A1 | 3/2006 | Marggraff et al. | |
| 2006/0067577 A1 | 3/2006 | Marggraff et al. | |
| 2006/0077184 A1 | 4/2006 | Marggraff et al. | |
| 2006/0078866 A1 | 4/2006 | Marggraff et al. | |
| 2006/0080608 A1 | 4/2006 | Marggraff et al. | |

(Continued)

FOREIGN PATENT DOCUMENTS

WO    WO 2007/141204 A1   12/2007

OTHER PUBLICATIONS

PCT International Search Report and Written Opinion, PCT Application No. PCT/US2009/039331, dated May 8, 2009, 7 pages.

*Primary Examiner* — George Bugg
*Assistant Examiner* — Renee Dorsey
(74) *Attorney, Agent, or Firm* — Fenwick & West LLP

(57) ABSTRACT

Embodiments of the invention present a system and method for controlling audio capture by a smart pen based computing system. An audio capture mechanism that is independent from a gesture capture system is included on the smart pen to control audio capture by one or more microphones included on the smart pen. In one embodiment, the audio capture mechanism comprises a shared function button, such as a power button. For example, a user interaction with the shared function button initiates audio capture by the one or more microphones on the smart pen and a second user interaction with the shared audio function stops audio capture. Alternatively, audio capture is stopped after completion of a predefined time interval after the user interaction with the shared function button.

17 Claims, 1 Drawing Sheet

U.S. PATENT DOCUMENTS

| | | |
|---|---|---|
| 2006/0080609 A1 | 4/2006 | Marggraff et al. |
| 2006/0125805 A1 | 6/2006 | Marggraff et al. |
| 2006/0127872 A1 | 6/2006 | Marggraff et al. |
| 2006/0292543 A1 | 12/2006 | Marggraff et al. |
| 2007/0097100 A1 | 5/2007 | Marggraff et al. |
| 2007/0280627 A1 | 12/2007 | Marggraff et al. |

* cited by examiner

QUICK RECORD FUNCTION IN A SMART PEN COMPUTING SYSTEM

CROSS REFERENCE TO RELATED APPLICATIONS

This application claims the benefit of U.S. Provisional Application No. 61/042,258, filed Apr. 3, 2008, which is incorporated by reference in its entirety.

BACKGROUND

This invention relates generally to pen-based computing systems, and more particularly to initiating audio capture by the smart pen independent of handwriting data capture.

In a smart pen computing system, a smart pen captures handwriting gestures as a user writes on a writing surface. The handwriting gestures can be stored in a memory of the smart pen or transmitted to a computer to allow the user to obtain a digital representation of a handwritten document. In a typical application, a smart pen simultaneously records audio and captures handwriting gestures, allowing a user to record conversations, or other audio data, occurring at the same time the user writes notes. The recorded audio and captured handwriting can be stored in a manner that preserves the temporal relationship between the recorded audio and the captured handwriting. For example, a note taking "movie" can be played which replays the notes as they were written while simultaneously replaying the recorded audio.

Traditionally, a smart pen senses when the user is writing with the pen smart pen and automatically begins recording audio. When the user stops writing, the smart pen stops recording audio. Thus, the user is unable to capture audio while not writing. Alternatively, a smart pen may begin and end recording audio in response to inputs received by a handwriting sensing mechanism in the smart pen. Because audio recording is triggered by input received by the handwriting sensing mechanism, the flexibility of smart pen applications is limited. Other conventional techniques require interaction between the smart pen and a printed control mechanism, requiring the smart pen to be in close proximity to the control mechanism to have recording capabilities. Accordingly, a smart pen having a secondary mechanism for initiating an audio capture function without requiring the smart pen to capture handwriting data or to interact with a printed control region is needed.

SUMMARY

Embodiments of the invention present a system and method for controlling audio capture by a smart pen based computing system. An audio capture mechanism that is independent from a gesture capture system is included on the smart pen to control audio capture by one or more microphones included on, or coupled with, the smart pen. In one embodiment, the audio capture mechanism comprises a shared function button, such as a power button. For example, a user interaction with the shared function button initiates audio capture by the one or more microphones on the smart pen and a second user interaction with the shared audio function stops audio capture. Alternatively, audio capture is stopped after completion of a predefined time interval after the user interaction with the shared function button.

The Figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of Pen-Based Computing System

Figure 1:
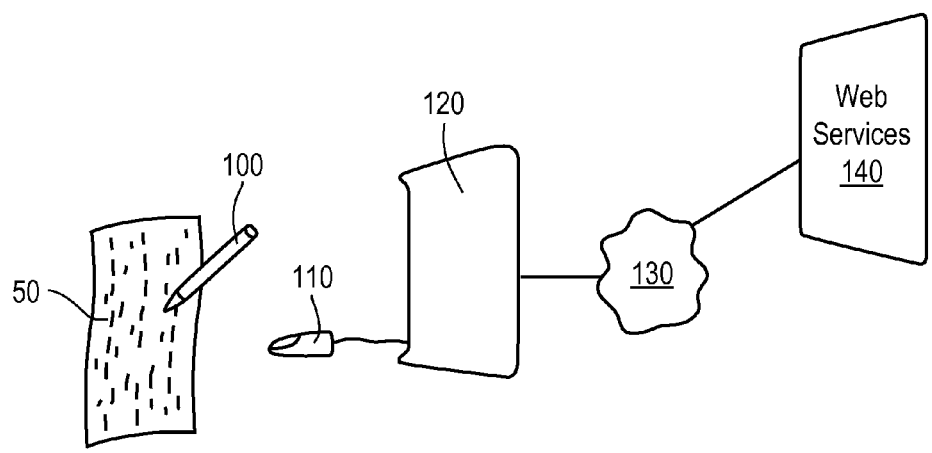
FIG. 1 is a schematic diagram of a pen-based computing system, in accordance with an embodiment of the invention.

Embodiments of the invention may be implemented on various embodiments of a pen-based computing system, an example of which is illustrated in FIG. 1. In this embodiment, the pen-based computing system comprises a writing surface 50, a smart pen 100, a docking station 110, a client system 120, a network 130, and a web services system 140. The smart pen 100 includes onboard processing capabilities as well as input/output functionalities, allowing the pen-based computing system to expand the screen-based interactions of traditional computing systems to other surfaces on which a user can write. For example, the smart pen 100 may be used to capture electronic representations of writing as well as record audio during the writing, and the smart pen 100 may also be capable of outputting visual and audio information back to the user. With appropriate software on the smart pen 100 for various applications, the pen-based computing system thus provides a new platform for users to interact with software programs and computing services in both the electronic and paper domains, including electronic paper.

In the pen based computing system, the smart pen 100 provides input and output capabilities for the computing system and performs some or all of the computing functionalities of the system. Hence, the smart pen 100 enables user interaction with the pen-based computing system using multiple modalities. In one embodiment, the smart pen 100 receives input from a user, using multiple modalities, such as capturing a user's writing or other hand gesture or recording audio, and provides output to a user using various modalities, such as displaying visual information, playing audio or responding in context to physical interaction such as tapping, tracing, or selecting other pre-existing visual information. In other embodiments, the smart pen 100 includes additional input modalities, such as motion sensing or gesture capture, and/or additional output modalities, such as vibrational feedback. By receiving different types of input, the smart pen 100 may simultaneously capture different types of data, such as audio, movement and/or written or text, which can be used to generate a session including different types of data.

Figure 2:
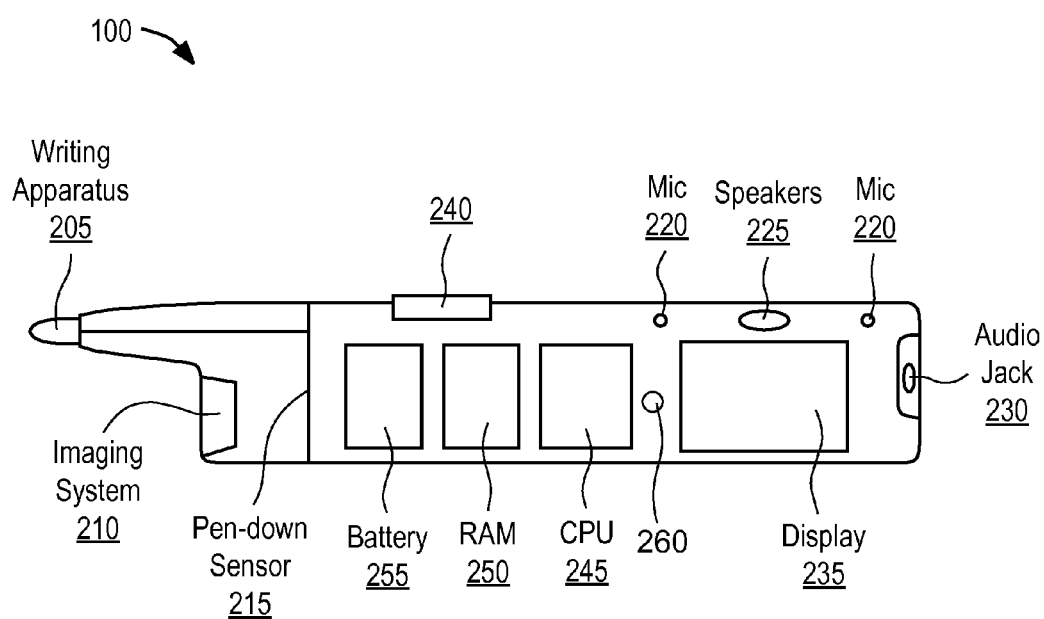
FIG. 2 is a diagram of a smart pen for use in the pen-based computing system, in accordance with an embodiment of the invention.

The components of a particular embodiment of the smart pen 100 are shown in FIG. 2 and described in more detail in the accompanying text. The smart pen 100 preferably has a form factor that is substantially shaped like a pen or other writing implement, although certain variations on the general shape may exist to accommodate other functions of the pen, or may even be an interactive multi-modal non-writing implement. For example, the smart pen 100 may be slightly thicker than a standard pen so that it can contain additional components, or the smart pen 100 may have additional structural features (e.g., a flat display screen) in addition to the structural features that form the pen shaped form factor. Additionally, the smart pen 100 may also include any mechanism by which a user can provide input or commands to the smart pen computing system or may include any mechanism by which a user can receive or otherwise observe information from the smart pen computing system. For example a variety of types of switches including buttons, rocker panels, capacitive sensors, heat sensors, pressure sensors, biometric sensors or other sensing devices could be added.

The smart pen 100 is designed to work in conjunction with the writing surface 50 so that the smart pen 100 can capture writing that is made on the writing surface 50. In one embodiment, the writing surface 50 comprises a sheet of paper (or any other suitable material that can be written upon) and is encoded with a pattern that can be read by the smart pen 100. An example of such a writing surface 50 is the so-called "dot-enabled paper" available from Anoto Group AB of Sweden (local subsidiary Anoto, Inc. of Waltham, Mass.), and described in U.S. Pat. No. 7,175,095, incorporated by reference herein. This dot-enabled paper has a pattern of dots encoded on the paper. A smart pen 100 designed to work with this dot enabled paper includes an imaging system and a processor that can determine the position of the smart pen's writing tip with respect to the encoded dot pattern. This position of the smart pen 100 may be referred to using coordinates in a predefined "dot space," and the coordinates can be either local (i.e., a location within a page of the writing surface 50) or absolute (i.e., a unique location across multiple pages of the writing surface 50).

In other embodiments, the writing surface 50 may be implemented using mechanisms other than encoded paper to allow the smart pen 100 to capture gestures and other written input. For example, the writing surface may comprise a tablet or other electronic medium that senses writing made by the smart pen 100. In another embodiment, the writing surface 50 comprises electronic paper, or e-paper. This sensing may be performed entirely by the writing surface 50, entirely by the smart pen 100, or in conjunction with the smart pen 100. Even if the role of the writing surface 50 is only passive (as in the case of encoded paper), it can be appreciated that the design of the smart pen 100 will typically depend on the type of writing surface 50 for which the pen based computing system is designed. Moreover, written content may be displayed on the writing surface 50 mechanically (e.g., depositing ink on paper using the smart pen 100), electronically (e.g., displayed on the writing surface 50), or not at all (e.g., merely saved in a memory). In another embodiment, the smart pen 100 is equipped with sensors to sense movement of the smart pen 100 tip, thereby sensing writing gestures without requiring a writing surface 50 at all. Any of these technologies may be used in a gesture capture system incorporated in the smart pen 100.

In various embodiments, the smart pen 100 can communicate with a general purpose computing system 120, such as a personal computer, for various useful applications of the pen based computing system. For example, content captured by the smart pen 100 may be transferred to the computing system 120 for further use by that system 120. For example, the computing system 120 may include management software that allows a user to store, access, review, delete, and otherwise manage the information acquired by the smart pen 100. Downloading acquired data from the smart pen 100 to the computing system 120 also frees the resources of the smart pen 100 so that it can acquire more data. Conversely, content may also be transferred back onto the smart pen 100 from the computing system 120. In addition to data, the content provided by the computing system 120 to the smart pen 100 may include software applications that can be executed by the smart pen 100.

The smart pen 100 may communicate with the computing system 120 via any of a number of known communication mechanisms, including both wired and wireless communications, such as Bluetooth, WiFi, RF, infrared and ultrasonic sound. In one embodiment, the pen based computing system includes a docking station 110 coupled to the computing system. The docking station 110 is mechanically and electrically configured to receive the smart pen 100, and when the smart pen 100 is docked the docking station 110 may enable electronic communications between the computing system 120 and the smart pen 100. The docking station 110 may also provide electrical power to recharge a battery in the smart pen 100.

FIG. 2 illustrates an embodiment of the smart pen 100 for use in a pen based computing system, such as the embodiments described above. In the embodiment shown in FIG. 2, the smart pen 100 comprises a marker 205, an imaging system 210, a pen down sensor 215, one or more microphones 220, a speaker 225, an audio jack 230, a display 235, an I/O port 240, a processor 245, an onboard memory 250, and a battery 255. It should be understood, however, that not all of the above components are required for the smart pen 100, and this is not an exhaustive list of components for all embodiments of the smart pen 100 or of all possible variations of the above components. For example, the smart pen 100 may also employ buttons, such as a power button or an audio recording button and/or status indicator lights. Moreover, as used herein in the specification and in the claims, the term "smart pen" does not imply that the pen device has any particular feature or functionality described herein for a particular embodiment, other than those features expressly recited. A smart pen may have any combination of fewer than all of the capabilities and subsystems described herein.

The marker 205 enables the smart pen to be used as a traditional writing apparatus for writing on any suitable surface. The marker 205 may thus comprise any suitable marking mechanism, including any ink-based or graphite-based marking devices or any other devices that can be used for writing. In one embodiment, the marker 205 comprises a replaceable ballpoint pen element. The marker 205 is coupled to a pen down sensor 215, such as a pressure sensitive element. The pen down sensor 215 thus produces an output when the marker 205 is pressed against a surface, thereby indicating when the smart pen 100 is being used to write on a surface.

The imaging system 210 comprises sufficient optics and sensors for imaging an area of a surface near the marker 205. The imaging system 210 may be used to capture handwriting and/or gestures made with the smart pen 100. For example, the imaging system 210 may include an infrared light source that illuminates a writing surface 50 in the general vicinity of the marker 205, where the writing surface 50 includes an encoded pattern. By processing the image of the encoded pattern, the smart pen 100 can determine where the marker 205 is in relation to the writing surface 50. An imaging array of the imaging system 210 then images the surface near the marker 205 and captures a portion of a coded pattern in its field of view. Thus, the imaging system 210 allows the smart pen 100 to receive data using at least one input modality, such as receiving written input. The imaging system 210 incorporating optics and electronics for viewing a portion of the writing surface 50 is just one type of gesture capture system that can be incorporated in the smart pen 100 for electronically capturing any writing gestures made using the pen, and other embodiments of the smart pen 100 may use other appropriate means for achieving the same function. In an embodiment, data captured by the imaging system 210 is subsequently processed, allowing one or more content recognition algorithms, such as character recognition, to be applied to the received data.

In an embodiment, data captured by the imaging system 210 is subsequently processed, allowing one or more content recognition algorithms, such as character recognition, to be applied to the received data. In another embodiment, the imaging system 210 can be used to scan and capture written content that already exists on the writing surface 50 (e.g., and not written using the smart pen 100). The imaging system 210 may further be used in combination with the pen down sensor 215 to determine when the marker 205 is touching the writing surface 50. As the marker 205 is moved over the surface, the pattern captured by the imaging array changes, and the user's handwriting can thus be determined and captured by a gesture capture system (e.g., the imaging system 210 in FIG. 2) in the smart pen 100. This technique may also be used to capture gestures, such as when a user taps the marker 205 on a particular location of the writing surface 50, allowing data capture using another input modality of motion sensing or gesture capture.

The imaging system 210 may further be used in combination with the pen down sensor 215 to determine when the marker 205 is touching the writing surface 50. As the marker 205 is moved over the surface, the pattern captured by the imaging array changes, and the user's handwriting can thus be determined and captured by the smart pen 100. This technique may also be used to capture gestures, such as when a user taps the marker 205 on a particular location of the writing surface 50, allowing data capture using another input modality of motion sensing or gesture capture.

Another data capture device on the smart pen 100 are the one or more microphones 220, which allow the smart pen 100 to receive data using another input modality, audio capture. The microphones 220 may be used for recording audio, which may be synchronized to the handwriting capture described above. In an embodiment, the one or more microphones 220 are coupled to signal processing software executed by the processor 245, or by a signal processor (not shown), which removes noise created as the marker 205 moves across a writing surface and/or noise created as the smart pen 100 touches down to or lifts away from the writing surface.

In an embodiment, the processor 245 synchronizes captured written data with captured audio data. Hence, in an operating mode, the microphones 220 record audio when the imaging system 210 captures writing by the smart pen 100, allowing automatic capture of audio data when the imaging system 210 is capturing handwriting data. In this operating mode, the microphones 220 stop capturing audio data when the imaging system 210 stops capturing handwriting data. Alternatively, the microphones 220 record audio responsive to the imaging system 210 capturing a command included in the handwriting data.

For example, a conversation in a meeting may be recorded using the microphones 220 or using a microphone coupled to the smart pen 100 via the audio jack 230 while a user is taking notes that are also being captured by the smart pen 100. Synchronizing recorded audio and captured handwriting allows the smart pen 100 to provide a coordinated response to a user request for previously captured data. For example, responsive to a user request, such as a written command, parameters for a command, a gesture with the smart pen 100, a spoken command or a combination of written and spoken commands, the smart pen 100 provides both audio output and visual output to the user. The smart pen 100 may also provide haptic feedback to the user.

However, to record audio using the microphones 220 when the smart pen 100 is not used for writing or when printed controls are not readily accessible, the smart pen 100 also includes a secondary recording method allowing a user to initiate a "quick record" mode which causes the microphones 220 to capture audio when the smart pen 100 is not used for writing or cannot interact with a printed control. For example the "quick record" mode allows the microphones 220 to capture audio data when the smart pen 100 is used with paper that does not include printed controls or when the smart pen 100 is used without paper. The quick record mode can be stopped responsive to a user input to stop the microphones 220 from recording audio. Alternatively, the quick record mode stops audio capture after a predetermined time interval from initiation of the quick record mode.

An embodiment of the smart pen 100 includes a shared function button 260 which both toggles whether or not the smart pen 100 receives power and affects the quick record mode. The shared function button 260 may be operated in different ways to control both power and the quick record mode. For example, tapping the shared function button 260 causes the smart pen 100 to toggle between a power-off mode and a power-on mode while holding down the shared function button 260 for at least a predetermined length of time (e.g., 2 seconds) initiates the quick record mode. Once the quick record mode is initiated, the microphones 220 begin recording audio and continue to record audio until the shared function button 260 is depressed for a predetermined length of time (e.g., 2 seconds) or until the smart pen is powered off. Alternatively, holding down the shared function button 260 for a predetermined length of time toggles the smart pen 100 between a power-off mode and a power-on mode while tapping the shared function button 260 toggles the quick record mode on and off. In yet another embodiment, the operation of the shared function button 260 is determined by the number of taps, or other user interactions, with the shared function button 260. For example, three successive taps cause the shared function button 260 to toggle the quick record mode on and off while two successive taps cause the shared function button 260 to toggle the smart pen 100 between a power-on mode and power-off mode. Other methods use other durations or sequences of input received by the shared function button 260, accounting for different interactions and time intervals, to determine an action performed by the shared function button 260.

Other variations of controlling multiple functions or modes with a single button, such as the shared function button 260, will be apparent to those of ordinary skill in the art. Beneficially, dual use of a shared function button 260 allows the smart pen 100 to include a single button, allowing for a more compact and easier to use form factor.

In alternative embodiments, a different secondary mechanism may be used to allow manual control of audio capture. For example, the quick record mode may be enabled or disabled by one or more dedicated buttons that are separate from a power button. Alternatively, the user may tap a pre-printed symbol or control on a writing surface 50 or a hand drawn symbol or command is captured by the imaging system 210 to initiate audio recording by the microphones 220. Similarly, audio capture by the microphones 220 may be terminated in a number of ways. For example, holding down a power button or switch for two seconds or double pressing the power button may terminate audio capture. As another example, audio capture by the microphones 220 is initiated by depressing the shared function button 260 for a predetermined length of time and audio is captured while the shared function button 260 remains depressed and audio capture is stopped when the shared function button 260 is released. Other variations of audio capture control will be apparent to those of ordinary skill in the art in view of the example embodiments described herein.

In an embodiment, the smart pen 100 distinguishes audio data captured using the quick record mode from audio data captured while the imaging system 210 captures handwritten data. For clarity, audio data captured using the quick record mode is referred to herein as "quick record sessions." After being recorded, the quick record sessions are catalogued as distinct data that can be directly and rapidly accessed using the smart pen 100.

When audio data has been recorded, a variety of access methods may be used to identify and locate stored audio data and to initiate playback. In one embodiment, a user may double-tap the smart pen 100 on a writing surface 50 and write the letter "r" with the smart pen 100, causing a scrollable list of stored audio data to appear on the display 235. "Quick record" sessions are distinguished from conventionally captured sessions in the scrollable list. For example, "quick record" sessions are placed in a specific location of the scrollable list, such as the beginning of the scrollable list or the end of the scrollable list. Alternatively, a separate list including "quick record" sessions is maintained. A user may then navigate through the audio data presented on the display 235 and select audio data for replay. For example, another gesture received by the imaging system 210, such as a tap, double tap or other user input, causes the selected audio to be played back. Alternatively, as the user navigates through the audio data, the display provides information about different portions of the audio data, such as the recording date, the location of an ink tag associated with the audio data (e.g., a notebook identifier, a page number, a page location, row or column number) or other suitable data.

In another embodiment, the scrollable list of stored audio data is presented on the display 235 responsive to one or more interactions between the smart pen 100 and the writing surface 50. Additional interactions between the smart pen 100 and the writing surface 50 allow navigation through the stored audio data. Hence, the captured audio data may be accessed and manipulated using a multi-modal intelligent writing tool, such as the smart pen 100, that may capture, interpret and display both exemplar symbols, in an animated manner, supplemented with synchronized audio instruction and feedback.

The speaker 225, audio jack 230, and display 235 provide outputs to the user of the smart pen 100 allowing presentation of data to the user via one or more output modalities. The audio jack 230 may be coupled to earphones so that a user may listen to the audio output without disturbing those around the user, unlike with a speaker 225. Earphones may also allow a user to hear the audio output in stereo or full three-dimensional audio that is enhanced with spatial characteristics. Hence, the speaker 225 and audio jack 230 allow a user to receive data from the smart pen using a first type of output modality by listening to audio played by the speaker 225 or the audio jack 230. Additionally, the audio jack 230 may be coupled to an external microphone, allowing audio data to be captured and communicated to the smart pen 100 via the audio jack 230.

The display 235 may comprise any suitable display system for providing visual feedback, such as an organic light emitting diode (OLED) display, allowing the smart pen 100 to provide output using a second output modality by visually displaying information. In use, the smart pen 100 may use any of these output components to communicate audio or visual feedback, allowing data to be provided using multiple output modalities. For example, the speaker 225 and audio jack 230 may communicate audio feedback (e.g., prompts, commands, and system status) according to an application running on the smart pen 100, and the display 235 may display word phrases, static or dynamic images, or prompts as directed by such an application. In addition, the speaker 225 and audio jack 230 may also be used to play back audio data that has been recorded using the microphones 220.

The input/output (I/O) port 240 allows communication between the smart pen 100 and a computing system 120, as described above. In one embodiment, the I/O port 240 comprises electrical contacts that correspond to electrical contacts on the docking station 110, thus making an electrical connection for data transfer when the smart pen 100 is placed in the docking station 110. In another embodiment, the I/O port 240 simply comprises a jack for receiving a data cable (e.g., Mini-USB or Micro-USB). Alternatively, the I/O port 240 may be replaced by a wireless communication circuit in the smart pen 100 to allow wireless communication with the computing system 120 (e.g., via Bluetooth, WiFi, infrared, or ultrasonic).

A processor 245, onboard memory 250, and battery 255 (or any other suitable power source) enable computing functionalities to be performed at least in part on the smart pen 100. The processor 245 is coupled to the input and output devices and other components described above, thereby enabling applications running on the smart pen 100 to use those components. In one embodiment, the processor 245 comprises an ARM9 processor, and the onboard memory 250 comprises a small amount of random access memory (RAM) and a larger amount of flash or other persistent memory. As a result, executable applications can be stored and executed on the smart pen 100, and recorded audio and handwriting can be stored on the smart pen 100, either indefinitely or until off-loaded from the smart pen 100 to a computing system 120. For example, the smart pen 100 may locally stores one or more content recognition algorithms, such as character recognition or voice recognition, allowing the smart pen 100 to locally identify input from one or more input modality received by the smart pen 100.

In an embodiment, the smart pen 100 also includes an operating system or other software supporting one or more input modalities, such as handwriting capture, audio capture or gesture capture, or output modalities, such as audio playback or display of visual data. The operating system or other software may support a combination of input modalities and output modalities and manages the combination, sequencing and transitioning between input modalities (e.g., capturing written and/or spoken data as input) and output modalities (e.g., presenting audio or visual data as output to a user). For example, this transitioning between input modality and output modality allows a user to simultaneously write on paper or another surface while listening to audio played by the smart pen 100, or the smart pen 100 may capture audio spoken from the user while the user is also writing with the smart pen 100.

In an embodiment, the operating system and applications support a sequence of independent and/or concurrent input and output modalities and seamless transitions between these modalities to provide for language learning. For example, a language learning (LL) application running on an operating system supporting modality independence, concurrence and sequencing might begin a lesson announcing that today is a lesson in writing, reading, speaking and listening to Chinese. The smart pen 100 might then animate the creation of a Mandarin character, drawing strokes of the character in proper order on the display 235, while simultaneously announcing the character's pronunciation via the speaker 225. The operating system would enable the simultaneous display and synchronized delivery of audio. The LL application might then prompt the user to draw each stroke of the character, following the animated display of each stroke on the display 225, thus sequencing the transition between modalities of visual output of information displayed on the smart pen 100, in a synchronized manner, with the input of stroke data by a user. As the user becomes more fluent with the creations of the character, and begins writing more rapidly, perhaps writing ahead of the strokes displayed, the OS will enable real time capture and interpretation of strokes and respond with proper displaying and audio as appropriate, engaging the user in a multimodal dialogue. As the user demonstrates proficiency in writing, and the smart pen 100 begins to be lead by the user, displaying strokes in response, rather than leading with strokes, the smart pen 100 might verbally compliment the user and request the user to speak the sound for the character during or after the stroke writing. As the user speaks the character sound, the smart pen 100 could record the sound and compare it to an exemplar. The smart pen 100 might then prompt the user by playing back the exemplar pronunciation and the user pronunciation, providing commentary and/or visual guidance regarding correctness in pronunciation The smart pen 100 might then prompt the user to listen, write, and speak, announcing a series of words one by one, waiting for the user to write and speak the words, while comparing the input speech and writing to exemplars, and redirecting the user to repeat writing or speaking as necessary.

In an extension of this example, the smart pen 100 might prompt the user to interact with a pre-printed Language Learning text or workbook. The smart pen 100 might move the user's attention among multiple displays, from text, to the workbook, to a user's notebook, while continuing a dialogue involving the smart pen 100 speaking and displaying independently or concurrently, directing the user to speak, write, and look at information independently or concurrently. Various other combinations of input modalities and output modalities, and sequencing, are also possible.

In an embodiment, the processor 245 and onboard memory 250 include one or more executable applications supporting and enabling a menu structure and navigation through a file system or application menu, allowing launch of an application or of a functionality of an application. For example, navigation between menu items comprises a dialogue between the user and the smart pen 100 involving spoken and/or written commands and/or gestures by the user and audio and/or visual feedback from the smart pen computing system. Hence, the smart pen 100 may receive input to navigate the menu structure from a variety of modalities.

For example, a writing gesture, a spoken keyword or a physical motion, may indicate that subsequent input is associated with one or more application commands. Input with a spatial and/or temporal component may also be used to indicate that subsequent data. Examples of input with a spatial input include two dots side-by-side. Examples of input with a temporal component include two dots written one immediately after the other. For example, a user may depress the smart pen 100 against a surface twice in rapid succession then write a word or phrase, such as "solve," "send," "translate," "email," "voice-email" or another predefined word or phrase to invoke a command associated with the written word or phrase or receive additional parameters associated with the command associated with the predefined word or phrase. Because these "quick-launch" commands can be provided in different formats, navigation of a menu or launching of an application is simplified. The "quick-launch" command or commands are preferably easily distinguishable during conventional writing and/or speech.

Alternatively, the smart pen 100 also includes a physical controller, such as a small joystick, a slide control, a rocker panel, a capacitive (or other non-mechanical) surface or other input mechanism which receives input for navigating a menu of applications or application commands executed by the smart pen 100.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method. Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:
1. A smart pen device for capturing audio data comprising:
a processor integrated within the smart pen device;

a gesture capture system integrated within the smart pen device, the gesture capture system coupled to the processor and the gesture capture system for capturing written data;

one or more microphones integrated within the smart pen device, the one or more microphones coupled to the processor and the one or more microphones for capturing audio data;

a shared function button integrated within the smart pen device, the shared function button coupled to the processor and the shared function button for receiving a first input and a second input; and a non-transitory computer-readable storage medium storing computer program code and integrated within the smart pen device, the computer program code configured to be executed by the processor, the computer program code including instructions for initiating audio data capture by the one or more microphones responsive to the shared function button receiving the first input and performing a second action responsive to the shared function button receiving the second input.

2. The smart-pen device of claim 1, wherein the first input comprises a tap of the shared function button.

3. The smart-pen device of claim 2, wherein the second input comprises depressing the shared function button for at least a predetermined time interval.

4. The smart-pen device of claim 1, wherein the first input comprises depressing the shared function button for at least a predetermined time interval.

5. The smart-pen device of claim 1, wherein the second input comprises a tap of the shared function button.

6. The smart pen device of claim 1, wherein the first input comprises a plurality of consecutive taps of the shared function button.

7. A smart pen device for capturing audio and writing data comprising:
a processor integrated within the smart pen device;
a gesture capture system integrated within the smart pen device, the gesture capture system coupled to the processor and the gesture capture system for capturing the written data;
one or more microphones integrated within the smart pen device, the one or more microphones coupled to the processor and the one or more microphones for capturing the audio data; and
a shared function button integrated within the smart pen device, the shared function button coupled to the processor, wherein a first interaction with the shared function button initiates capturing of the audio data, and a second interaction with the shared function button controls a power on/off setting of the smart pen device, the second interaction distinct from the first interaction.

8. The smart pen device of claim 7, wherein the first interaction with the shared function button comprises a tap of the shared function button.

9. The smart pen device of claim 7, wherein the first interaction with the shared function button comprises depressing the shared function button for at least a predetermined time interval.

10. The smart pen device of claim 7, wherein the first interaction with the shared function button comprises a plurality of consecutive taps of the shared function button.

11. The smart pen device of claim 1, wherein the computer code further comprises instructions for:
detecting a predefined control included in the written data; and
initiating audio data capture by the one or more microphones responsive to detecting the predefined control.

12. The smart pen device of claim 1, wherein the computer code further comprises instructions for:
detecting a predefined audio command included in the audio data; and
initiating audio data capture by the one or more microphones responsive to detecting the predefined audio command.

13. The smart pen device of claim 1, wherein the computer code further comprises instructions for:
detecting an interaction of the smart pen device with a control area of a writing surface; and
initiating audio data capture by the one or more microphones responsive to detecting the interaction.

14. The smart pen device of claim 1,
wherein the computer code further comprises instructions for retrieving the audio data responsive to the smart pen device receiving a playback command.

15. The smart pen device of claim 14, wherein receiving the playback command comprises detecting a predefined written symbol in the captured writing data.

16. The smart pen device of claim 14, wherein receiving the playback command comprises detecting an interaction between the smart pen device and a predefined control region of a writing surface.

17. The smart pen device of claim 14, wherein receiving the playback command comprises:
detecting a predefined interaction by a user with the smart pen device;
displaying a scrollable list of a plurality of previously recorded audio data on a display on the smart pen device in response to detecting the predefined interaction; and
receiving a selection from the user of a specific one of the plurality of previously recorded audio data for playback.

* * * * *